UNITED STATES PATENT OFFICE.

THOMAS F. WELLS, OF NEW YORK, N. Y.

IMPROVEMENT IN PROCESSES OF SEPARATING TIN FROM IRON IN TINNERS' CLIPPINGS.

Specification forming part of Letters Patent No. 128,265, dated June 25, 1872.

Specification describing an Improved Process of Separating Tin from Iron in Tinners' Clippings and the utilization of the products obtained therefrom, invented by THOMAS F. WELLS, of the city, county, and State of New York.

My process consists in treating the tin scraps or tinners' clippings, first in muriatic or hydrochloric acid of 20° Baumé till the bath gets exhausted, then by gradually adding to the latter nitric acid of 40° Baumé, in conjunction with a concentrated solution of chlorate of potash or the same in powder, not exceeding a certain percentage to be mentioned hereafter.

By using hydrochloric acid without the subsequent addition of the chemicals mentioned one thousand pounds would have to be used for the cleaning of one ton of scraps of two thousand pounds, there being generally as much iron dissolved by the acid as there is tin on the iron. By adding, however, from two to three per cent. of nitric acid and from one to one and a half per cent. of chlorate of potash (of the amount of hydrochloric acid) to the bath, when the same has become exhausted, five hundred pounds of hydrochloric acid will suffice to treat one ton of scraps. I attribute this fact to the circumstance that the oxide (protoxide of tin) produced by the action of nitric acid is more readily soluble in weak hydrochloric acid than metallic tin is; but other reactions will also take place, the chemistry of which may be illustrated in the following:

(1.) $NO_5 + 3HCl = Cl + NO_2Cl_2 + 3HO$.
(2.) $NO_2Cl_2 + 3SnCl + xHCl = SnCl_2 + {_2}SnCl + NH_3 + 2HO + xHCl$. 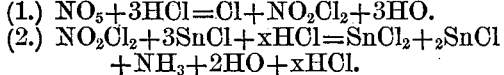

As will be seen from these formulas bichloride of tin and ammonia are being formed. Now, this latter, when coming in contact with the bichloride of tin, would produce a precipitate of hydrated oxide of tin, which would be lost in the process, since it is not soluble in acids. I propose, namely, to precipitate the tin from its solution in a metallic state, which would mingle with the hydrated oxide. Now, this latter, as is well known, requires a high heat to be reduced—both therefore could not be worked up together. These reactions, however, do not take place when chlorate of potash is added in conjunction with nitric acid. Free chlorine will be evolved abundantly, chloride of ammonium will be formed, and the precipitation of hydrated oxide of tin will thus be avoided.

In order to carry out my process I charge a perforated trommel or drum of copper, of suitable construction, with the clippings. This trommel is made to revolve in a vat or tank filled with hydrochloric acid almost to the rim. When the tin has been dissolved, the trommel is lifted out from the vat or tank into another one filled with water, in which it is rotated for a few minutes. From this bath it is finally again lifted out to be inserted into and rotated a short time in a third vat or tank containing a weak solution of silicate of soda or silicate of potash. This last solution I use in order that the iron clippings may not be subject to rusting.

From my experiments I find that the length of time for dissolving the tin from the iron increases with every new charge inserted from five to ten minutes. When it requires one hour to treat a charge properly, nitric acid with chlorate of potash are gradually stirred into the bath. This being done, the bath acquires new strength, as it were, and I am enabled to treat thus an equal amount of clippings to that treated before. The saving incurred by the addition of these chemicals amounts to five hundred pounds of muriatic acid per ton of clippings. The solution remains perfectly clear— viz., no precipitation of hydrated oxide takes place, which, by the addition of nitric acid only, will occur.

When the bath is completely exhausted— viz., when it will not dissolve any more tin— I draw it off into another vat or tank, placed below, and proceed with the precipitation of the tin. This is best effected by means of zinc or otherwise, the tin being separated in a metallic state ready for melting.

The liquor finally obtained consists of a solution of the chloride of iron and zinc, which is available for the preparation of paints, or as a disinfectant, or for the preservation of wood.

The process of precipitation by means of zinc being known, I make no claim to it; but What I do claim, and desire to secure by Letters Patent, is—

1. The separation of tin from iron in tinners' clippings, first, by means of hydrochloric acid of about 20° Baumé till the bath gets exhausted; then by gradually adding to the latter nitric acid in conjunction with a concentrated solution of chlorate of potash or of chlorate of potash in powder, both in the proportions named, substantially as described and set forth.

2. The treating of the iron clippings or iron scrap with a bath of silicate of soda or silicate of potash, in order to prevent rusting, as hereinbefore specified and set forth.

3. The utilization of the liquor remaining after the separation of the tin from the tinners' clippings or tin scraps by the means of zinc, for the purposes hereinbefore specified and set forth.

THOMAS F. WELLS.

Witnesses:
EDWARD S. CLINCH,
SAML. BRACKETT.